United States Patent [19]

Carter

[11] 4,453,415
[45] Jun. 12, 1984

[54] FLOW MEASURING DEVICE FOR FLUID CONVEYING SYSTEMS

[76] Inventor: William R. Carter, Rte. 6, Box 115, Brainerd, Minn. 56401

[21] Appl. No.: 338,031

[22] Filed: Jan. 8, 1982

[51] Int. Cl.³ .............................................. G01F 1/74
[52] U.S. Cl. ................................ 73/861.04; 73/861.69
[58] Field of Search ........... 73/861.42, 861.04, 861.65, 73/861.59, 28, 61 R

[56] References Cited

U.S. PATENT DOCUMENTS

| | | | |
|---|---|---|---|
| 1,145,860 | 7/1915 | Burnham | 73/861.65 |
| 3,554,011 | 1/1971 | van der Veen | 73/61 R |
| 3,926,050 | 12/1975 | Turner et al. | 73/861.04 |
| 4,144,754 | 3/1979 | Pitts, Jr. et al. | 73/861.04 X |
| 4,312,234 | 1/1982 | Rhodes et al. | 73/861.04 |

OTHER PUBLICATIONS

*Instruments and Control Systems*, vol. 33, Feb. 1960, pp. 277–280.

*Primary Examiner*—Gerald Goldberg
*Assistant Examiner*—Brian R. Tumm
*Attorney, Agent, or Firm*—Schroeder, Siegfried, Vidas & Arrett

[57] ABSTRACT

A system for measuring the quantity of particulate material carried by a fluid flow. The system is connected to receive the fluid flow and induces a change in direction in that flow. The pressure drop of the fluid flow across the direction change is sensed and the pressure drop related to the quantity of particulate material within the fluid flow. In a preferred embodiment, the direction change is along a generally helical path with the pressure drop being measured across at least a portion of that path. The pressure sensors may be adjusted to measure static as well as positive and negative velocity pressures so as to zero out the pressure drop due to the fluid flow alone.

18 Claims, 3 Drawing Figures

FLOW MEASURING DEVICE FOR FLUID CONVEYING SYSTEMS

DESCRIPTION

BACKGROUND OF PRIOR ART

The present invention relates to the measurement of the quantity of particulate material carried by a fluid flow.

Fluid conveyors are known to the prior art and provide an efficient system for moving solid materials from one location to another. A major advantage in such systems is that there often need be no moving parts between the conveyor inlet and/or outlet, or at least for great distances along the conveyor. The material being conveyed may be conveyed in a liquid as a slurry or as particulate material carried by a gas flow.

On delivery of the conveyed material at the desired location, the material is separated from the conveying fluid with the fluid being discharged or recycled. If the conveying fluid is to be discharged, it is often necessary to filter it, at least for environmental reasons if not for further material recovery. If not carefully monitored, the filter can become blinded requiring maintenance in the form of replacement or reconditioning of the filter medium. While blinding can be detected by monitoring the pressure drop across the filter medium, as by triggering an alarm at a preset pressure drop, this merely indicates that blinding has occurred and that maintenance is necessary.

Of course, continuing operation results in the blinding of any filter. However, in this instance where there is a collecting operation preceding the filter, the monitoring of the particulate flow between the collector and filter will allow a determination to be made that the collector is operating inefficiently resulting in excessive material flow and premature filter blinding. Thus, such monitoring will indicate an acceleration of filter blinding prior to the occurrence of the blinding, with proper collector adjustment allowing longer operation before maintenance. Further, such a system would allow a greater collecting efficiency.

BRIEF SUMMARY OF INVENTION

The present invention provides a system for measuring the quantity of particulate material carried by a fluid flow and has particular application to a monitoring of the amount of particulate material at the discharge of a collecting device in a fluid conveying system. The system of the present invention receives the fluid flow from the collector discharge and induces a change in direction in that flow. The pressure drop across the direction change is sensed with that pressure drop being related to the quantity of particulate material within the fluid flow. In a preferred embodiment, a direct reading of the amount of particulate material in the flow is provided. However, as an alternative, the pressure drop may be read out with the quantity of particulate material being determined from appropriate charts.

In a preferred embodiment, the direction change is helical with the pressure drop being sensed across at least a portion of the helical path. Further, the pressure drop sensing devices may be constructed so as to measure static as well as positive and negative velocity pressures, proper adjustment of these devices resulting in a measurement of pressure drop resulting from the particulate material only. In a preferred embodiment, the pressure drop measuring devices are tubes having beveled termini, the bevel having a preferred angle of approximately 30°, with the tubes being positioned in spaced relation to each other along the helical direction change. Rotation of the tubes results in a selection of the measurement of static or positive or negative velocity pressure allowing the pressure drop from the fluid itself to be "zeroed out." In those cases where the fluid flow has a pressure below atmospheric pressure, a port through the tube wall to atmospheric pressure will maintain the inner portions of the tube free of particulate material, without deleterious effect to the pressure measurement.

DETAILED DESCRIPTION OF INVENTION

Figure 1:
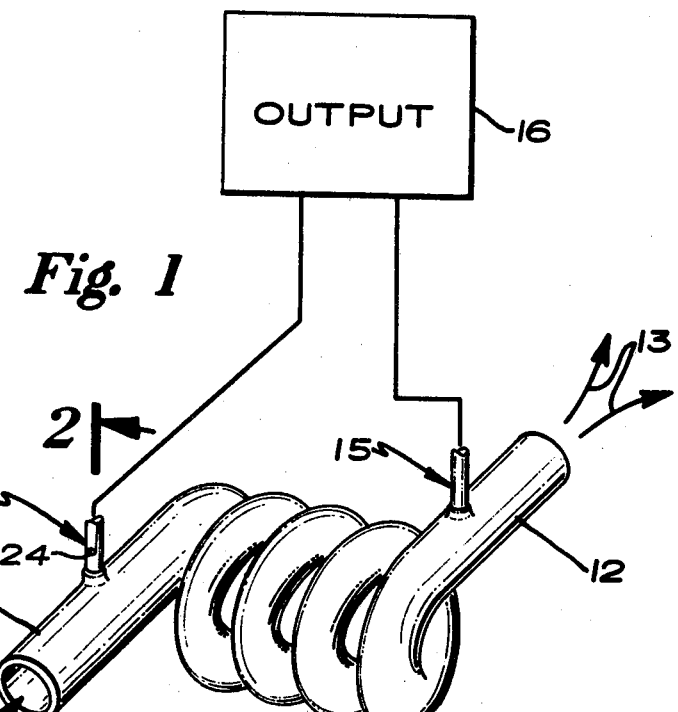
FIG. 1 illustrates the operation of a preferred embodiment of the present invention.

FIG. 1 illustrates the operation of a preferred embodiment of the present invention. In FIG. 1, a conduit is formed into a helical configuration (4 helices being illustrated in FIG. 1), the helical portion being designated generally at 10. An inlet portion 11 is adapted to receive a fluid flow as by connection to the discharge of a collector which separates particulate material from the transporting fluid of a fluid conveyor system. The outlet 12 of the system may be connected to a filter or may discharge to atmosphere, dependent on the requirements of the particular installation. Arrows 13 indicate the direction of flow through the system of FIG. 1.

A fluid flow through the conduit illustrated in FIG. 1 will result in a pressure drop from the inlet to the outlet. This pressure drop will be greater, for an equivalent distance traveled, through the helical portion 10 than through the straight portions of inlet 11 and outlet 12. Thus, the helical portion 10 not only allows a given length of conduit to be positioned in a shorter distance, it also increases the pressure drop through that length of conduit. In this manner, any operating parameter that alters the pressure drop will have a greater effect within the helical portion 10 than in the straight portions 11 and 12.

Any particulate material carried by the fluid flow will increase the pressure drop during the flow through the conduit of FIG. 1. The more the particulate material, the greater the pressure drop. This pressure drop results from the energy necessary to change the direction of movement of the particulate material. It should be noticed that any direction change will result in an increased pressure drop for a given length of conduit. However, for the purposes of the present invention, helical direction changes are preferred with the number of helices determining the sensitivity of the measurement, the greater the number of helices the greater the pressure drop and the sensitivity of the particulate material measurement.

In the embodiment of FIG. 1, the pressure drop across the helical portion 10 is measured at two pressure taps 14 and 15. An output device 16 measures the differential pressure drop from tap 14 to tap 15. The output device 16 may be any known differential pressure gauge having a readout in units of pressure drop or, alternatively, it may be calibrated to have a readout in units of particulate material per cubic unit of fluid. The output device may also incorporate recording devices to maintain a permanent record of the pressure drop and/or the quantity of particulate material.

Figure 2:
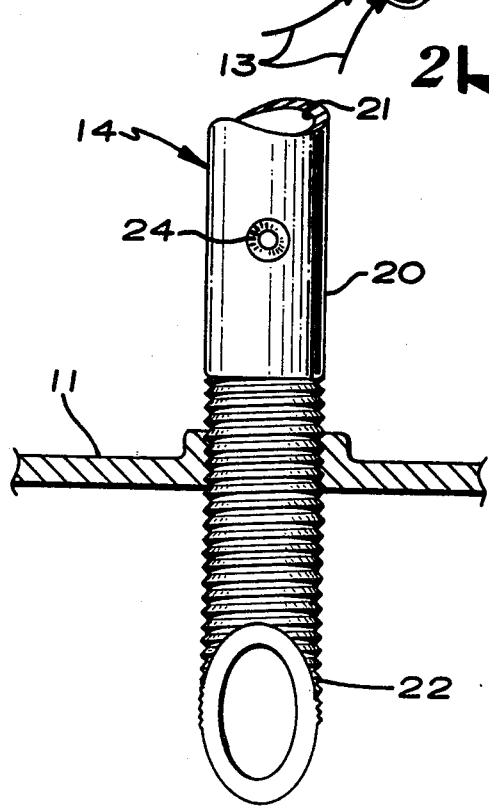
FIG. 2 illustrates a tube employed for pressure measurement within the embodiment of FIG. 1.
Figure 3:
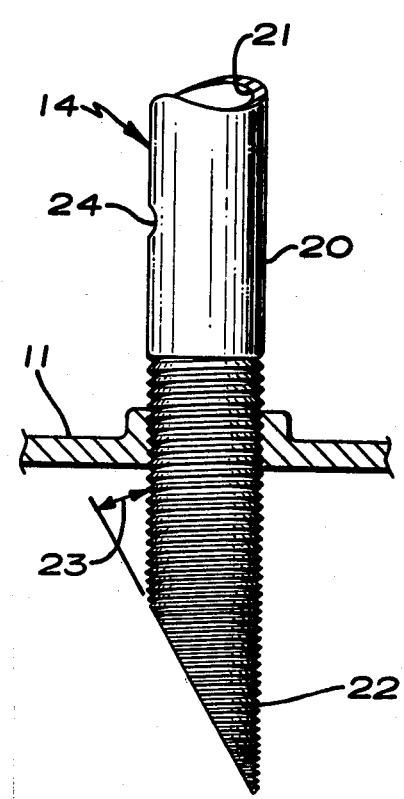
FIG. 3 illustrates another view of the tube of FIG. 2.

FIGS. 2 and 3 illustrate a preferred embodiment of a pressure tap that may be employed as either or both of the pressure taps 14 and 15 in FIG. 1. The pressure taps of FIGS. 2 and 3 are formed of a tubular body 20 having a central passage 21. The body of the pressure taps of FIGS. 2 and 3 may be formed from standard pipe, for example. The body 20 has a beveled terminus 22 the angle of the bevel 23 being preferably approximately 30°. The beveled terminus 22 is threaded past the end of the bevel for reasons to be explained more fully below. A port 24 passes through the sidewall of the body 20 at a point beyond the threads for reasons that will also be explained more fully below. The end of the body 20 opposite the beveled terminus 22 may be connected to a transducer which generates a signal representative of the pressure within the aperture 21 or, alternatively, the aperture 21 may be directly connected, as by tubing, to a pressure sensing device. Separate pressure sensing devices may be employed for each of pressure taps 14 and 15. However, it is believed most expedient to employ a differential pressure sensor to sense the pressure drop from the tap 14 to the tap 15 for the purpose of relating that pressure drop to the quantity of particulate material within the fluid flow.

At the location of the pressure taps 14 and 15 in FIG. 1, the conduit which forms the fluid flow path has a threaded bore through to the inside of the conduit. The bore thread is compatible with the thread of the beveled terminus 22 such that terminus may be screwed into the bore with the entirety of the beveled terminus 22 lying within the flow path inside the conduit. The port 24 will remain outside the flow path exposed to atmospheric pressure. By rotating the body 20, each of the taps 14 and 15, configured as illustrated in FIGS. 2 and 3, can be set to measure static pressure or positive or negative velocity pressure. That is, with the face of the beveled terminus 22 facing upstream or into the flow (a flow from left to right in FIG. 3), the pressure within the aperture 21 will represent positive velocity pressure. Conversely, with the face of the beveled terminus 22 facing downstream (a flow from right to left in FIG. 3), a negative velocity pressure will be present within the aperture 21. At some point intermediate the positive and negative velocity pressure maximum points, the pressure within the aperture 21 will represent static pressure.

In operation, and with tubes configured as illustrated in FIGS. 2 and 3 in position as illustrated at 14 and 15 in FIG. 1, and with those tubes appropriately connected to an output device 16 as discussed above, a flow is induced through the conduit as by introducing a flow into the inlet 11 or withdrawing fluid from the outlet 12. In most instances the latter will be the case such that the pressure within the conduit will be negative. With fluid flow only through the conduit (no particulate material), the tubes at the pressure tap locations 14 and 15 may be rotated until the output device 16 registers zero pressure drop or zero particulate material flow. Typically, this may be accomplished by establishing a positive velocity pressure at the location 14 or a negative velocity pressure at the location 15 or any combination of pressures that satisfy zero output reading at output device 16. At that point, particulate material can be allowed to be carried through the helical portion 10 with the pressure drop measured between the taps 14 and 15 then being representative of the pressure drop resulting from the flow of particulate material only. It has been found that this pressure drop is a linear function of weight per cubic unit of fluid flow. With a steady fluid flow, this results in pressure drop being a linear function of the particulate material flow rate in weight per unit of time. Accordingly, the output device 16 may provide a readout of differential pressure drop, the amount of particulate material passing through the conduit with each cubic unit of fluid or the amount of particulate material per unit of time. Any of these indications can be employed to determine if the amount of particulate material flowing through the conduit is excessive, in the instance where filter blinding is a concern or when environmental considerations are a concern. Alternatively, the system may be employed as a direct measurement device to determine an actual quantity measurement when the input quantity is unknown, for any application. The port 24, being exposed to atmospheric pressure, will induce a slight flow through the aperture 21 in the instance where the internal conduit pressure is negative to assist in preventing the particulate material from blocking the aperture 21.

Obviously, many modifications and variations of the present invention are possible in light of the above teachings, For example, as noted above, any type of pressure gauge may be employed with the output device 16 having any desired output reading. Further, any number of direction changes may be employed with a helical direction change being preferred and with an increasing number of helices providing a greater sensitivity. It is therefore to be understood that, within the scope of the appended claims, the invention may be practiced otherwise than as specifically described.

I claim:
1. A system for measuring the quantity of particulate material carried by a fluid flow which comprises:
 (a) means for receiving said fluid flow and including means constructed and arranged for conducting said fluid flow from an inlet through an outlet along a generally helical path such that the pressure drop across said conducting means is increased due to the change in the direction of flow;
 (b) means for sensing the pressure drop of said fluid flow, said means including pressure tap means, said pressure tap means consisting of two pressure taps incorporated within and separated by at least a portion of said generally helical path; and
 (c) means for relating said pressure drop to the quantity of particulate material within said fluid flow.
2. The system of claim 1 wherein said pressure drop measuring means pressure taps include first and second tube means positioned within said fluid flow in spaced relation to each other along the line of flow.
3. The system of claim 1 wherein said helical path traverses an arc of approximately 360°.
4. The system of claim 1 wherein said helical path traverses an arc of at least 360°.
5. The system of claim 1 wherein said pressure sensing means comprise means for measuring static, positive and negative velocity pressure.
6. The system of claim 1 wherein said pressure sensing means comprise means for measuring pressure drop resulting from particulate material only.
7. The system of claim 6 wherein said helical path traverses an arc of approximately 360°.

8. The system of claim 6 wherein said helical path traverses an arc of at least 360°.

9. A system for measuring the quantity of particulate material carried by a fluid flow which comprises:
   (a) means for receiving said fluid flow and including means constructed and arranged for conducting said fluid flow from an inlet through an outlet along a generally helical path such that the pressure drop across said conducting means is increased due to a change in the direction of flow;
   (b) means for sensing the pressure drop of said fluid flow, said means including pressure tap means, said pressure tap means consisting of two pressure taps positioned within said fluid flow in spaced relation to each other along said generally helical path, said pressure taps having a beveled terminus within said fluid flow; and (c) means for relating said pressure drop to the quantity of particulate material within said fluid flow.

10. The system of claim 9 wherein said beveled terminus has an angle of approximately 30°.

11. The system of claim 9 wherein said helical path traverses an arc of approximately 360°.

12. The system of claim 9 wherein said helical path traverses an arc of at least 360°.

13. The system of claim 9 wherein said tube means are rotatable.

14. The system of claim 13 wherein said helical path traverses an arc of approximately 360°.

15. The system of claim 13 wherein said helical path traverses an arc of at least 360°.

16. The system of claim 13 wherein said tube means include port means exposed to atmospheric pressure for inducing atmospheric air flow within said tube means, said port means being constructed and arranged to prevent particulate blocking said tube means.

17. A system for measuring the quantity of particulate material carried by a gas flow which comprises:
   conduit means having an inlet and an outlet and including at least a one turn helix therebetween for inducing a pressure drop in said gas flow;
   a pair of pressure taps within said conduit at opposite end portions of said helix;
   rotatable tube means positioned within said pressure taps extending into said gas flow, said tube means including a beveled terminus within said fluid flow such that rotation of said beveled tube means effectively cancels static gas pressure drop across said helix; and
   means for relating the pressure drop across said rotatable tube means to the quantity of particulate material within said gas flow.

18. The system of claim 17 wherein said rotatable tube means extend outwardly from said conduit into the atmosphere and include side aperture means exposed to the atmosphere for inducing atmospheric air flow therewithin to prevent blockage of said tube means by said particulate material.

* * * * *